United States Patent
Abdyli et al.

(10) Patent No.: US 11,364,782 B2
(45) Date of Patent: Jun. 21, 2022

(54) MOTOR VEHICLE HAVING A PLURALITY OF BATTERY MODULES

(71) Applicant: Bayerische Motoren Werke Aktiengesellschaft, Munich (DE)

(72) Inventors: Fortesa Abdyli, Denkendorf (DE); Michael Ahlers, Munich (DE); Gabriel Alejandro Freire, Karlsruhe (DE); Maximilian Rolle, Stuttgart (DE); Christopher Schoenhoff, Ottersweier (DE); Hermann Seltenreich, Bretten (DE); Markus Strauch, Karlsruhe (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 16/969,220

(22) PCT Filed: Oct. 31, 2018

(86) PCT No.: PCT/EP2018/079862
§ 371 (c)(1),
(2) Date: Aug. 12, 2020

(87) PCT Pub. No.: WO2019/158235
PCT Pub. Date: Aug. 22, 2019

(65) Prior Publication Data
US 2020/0406737 A1   Dec. 31, 2020

(30) Foreign Application Priority Data
Feb. 13, 2018  (DE) .................... 10 2018 202 191.0

(51) Int. Cl.
*B60K 1/04*  (2019.01)
*B60L 3/00*  (2019.01)
*B62D 21/03* (2006.01)

(52) U.S. Cl.
CPC .............. *B60K 1/04* (2013.01); *B60L 3/0007* (2013.01); *B62D 21/03* (2013.01); *B60K 2001/0438* (2013.01)

(58) Field of Classification Search
CPC ......... B62D 21/03; B60K 1/04; H01M 50/20; B60L 3/0007
See application file for complete search history.

(56) References Cited

U.S. PATENT DOCUMENTS

| 9,673,433 | B1 | 6/2017 | Pullalarevu et al. |
| 2013/0153317 | A1 | 1/2013 | Rawlinson et al. |

(Continued)

FOREIGN PATENT DOCUMENTS

| DE | 10 2009 052 371 A1 | 6/2010 |
| DE | 10 2009 040 598 A1 | 3/2011 |

(Continued)

OTHER PUBLICATIONS

International Search Report (PCT/ISA/210) issued in PCT Application No. PCT/EP2018/079862 dated Feb. 27, 2019 with English translation (six (6) pages).

(Continued)

*Primary Examiner* — Jonathan Ng
*Assistant Examiner* — James J Triggs
(74) *Attorney, Agent, or Firm* — Crowell & Moring LLP

(57) ABSTRACT

A motor vehicle has a plurality of battery modules for storing electrical energy in the region of an underbody of a passenger compartment of the motor vehicle. The underbody is delimited on each of the two sides by a side sill. As viewed in the vehicle longitudinal direction, at least two battery modules are arranged adjacent to each other between the side sills, wherein the battery modules adjoin the respective side sills and a deformation element is arranged in each case between the adjacent battery modules. The battery (Continued)

modules are protected against damage in the event of a side crash.

14 Claims, 6 Drawing Sheets

(56) References Cited

U.S. PATENT DOCUMENTS

| | | | |
|---|---|---|---|
| 2013/0075173 A1* | 3/2013 | Kato | H01M 50/20 |
| | | | 180/68.5 |
| 2014/0117716 A1 | 5/2014 | Patberg et al. | |
| 2015/0197144 A1 | 7/2015 | Jarocki | |
| 2017/0203668 A1 | 7/2017 | Enning | |
| 2017/0305249 A1* | 10/2017 | Hara | H01M 50/20 |

FOREIGN PATENT DOCUMENTS

| | | |
|---|---|---|
| DE | 10 2009 053 138 A1 | 5/2011 |
| DE | 10 2011 107 210 A1 | 3/2012 |
| DE | 10 2011 051 698 A1 | 1/2013 |
| DE | 10 2011 120 960 A1 | 4/2013 |
| DE | 10 2012 000 622 A1 | 7/2013 |
| DE | 10 2013 208 682 A1 | 11/2014 |
| DE | 10 2015 100 244 A1 | 7/2015 |
| DE | 10 2017 101 110 A1 | 7/2017 |
| DE | 10 2016 203 740 A1 | 9/2017 |
| EP | 3 412 486 A1 | 12/2018 |
| FR | 2 979 078 A1 | 2/2013 |
| JP | 7-246843 A | 9/1995 |
| WO | WO 2015/124989 A1 | 8/2015 |
| WO | WO 2016/008567 A1 | 1/2016 |

OTHER PUBLICATIONS

German-language Written Opinion (PCT/ISA/237) issued in PCT Application No. PCT/EP2018/079862 dated Feb. 27, 2019 (six (6) pages).

German-language Search Report issued in German Application No. 10 2018 202 191.0 dated Jan. 21, 2019 with partial English translation (12 pages).

* cited by examiner

MOTOR VEHICLE HAVING A PLURALITY OF BATTERY MODULES

BACKGROUND AND SUMMARY OF THE INVENTION

The invention relates to a motor vehicle having a plurality of battery modules for storing electrical energy in a region of an underbody of a passenger cell of the motor vehicle.

Batteries having battery modules for storing electrical energy are generally known which have a plurality of individual storage cells which are arranged adjacent one another such that the battery has the desired voltage level or storage capacity. It is also known that the storage cells contain substances which are injurious to health or combustible if they escape upon damage to the storage cell. It is therefore important that the storage cells are not damaged.

Safety is of great importance particularly in the case of electrically driven motor vehicles, since it has to be ensured that, even in the event of a crash, the storage cells are as far as possible not damaged, or at least no dangerous substances can escape.

DE 10 2009 053 138 A1 has already disclosed a motor vehicle having a battery for storing electrical energy that is connected to a supporting structure of the motor vehicle via at least one holding device. At least one energy absorption element is provided in the region directly surrounding the battery and serves to eliminate the kinetic energy of the battery and/or of the motor vehicle in a crash situation. The holding device can have a predetermined breaking point which is designed such that it breaks under overload by a defined minimum force and, as a result, the battery is freely movable in at least one spatial direction.

DE 10 2011 120 960 A1 has also disclosed a motor vehicle having a battery which is arranged below a vehicle floor and is protected from a side crash by lateral deformation elements. Here, the deformation elements are each arranged between a side sill of the motor vehicle and the battery.

DE 10 2009 052 371 A1 has disclosed a motor vehicle having a plurality of battery modules which are arranged next to one another in a battery housing in the vehicle transverse direction. The battery modules are arranged and/or designed in such a way that they can be nondestructively moved and/or deformed by an action of force on the vehicle that deforms the vehicle body.

It is the object of the invention to provide a motor vehicle having a plurality of battery modules, wherein the battery modules are protected from damage in the event of a side crash in a simple manner.

This object is achieved by a motor vehicle having a plurality of battery modules according to the claimed invention.

According to the invention, a motor vehicle has a plurality of battery modules for storing electrical energy in the region of an underbody of a passenger cell of the motor vehicle. Here, the underbody is delimited on both sides by a respective side sill. As viewed in the vehicle longitudinal direction, at least two battery modules are arranged next to one another between the side sills, wherein the battery modules each adjoin the side sill and, in each case, a deformation element is arranged between the battery modules.

Accommodating the battery modules in the region of the underbody of the passenger cell offers very good protection in the event of a front or rear crash, since, as viewed in the vehicle longitudinal direction, the passenger cell is adjoined at the front by a front end section and at the rear by a rear end section. In the event of a front crash or rear crash, the front end section or rear end section is deformed and takes up at least a major portion of the forces. Accordingly, in the event of a front or rear crash, the entire passenger cell is well protected and is ideally even not deformed at all. Therefore, the battery modules in the underbody of the passenger cell are also well protected in the event of a front or rear crash. The greatest risk of significant damage to a battery module in the underbody thus exists in the event of a side crash in which another vehicle or a barrier strikes the motor vehicle in the region of the passenger cell in the vehicle transverse direction. The arrangement according to the invention allows a situation in which, in such a case, the battery module on the vehicle side on which the other vehicle or the barrier strikes is displaced in the vehicle transverse direction toward the battery module situated behind it, as viewed in the vehicle transverse direction. Here, the deformation element is compressed between the battery modules. The deformation element can be plastically and/or elastically deformed. In any case, the deformation element, upon deformation, absorbs at least some of the energy introduced.

The arrangement of a plurality of battery modules next to one another with interposed deformation elements thus allows a certain degree of "yielding", that is to say a displacement of a battery module in the vehicle transverse direction in the event of a side crash. In this way, parts of the vehicle body and of the underbody can be deformed without damage occurring here at the same time to the battery module, since the latter can be displaced out of the particularly critical region toward an adjacent battery module and compresses the interposed deformation element in the process.

Ideally, as viewed in the vehicle longitudinal direction, multiple battery modules arranged next to one another are accommodated behind one another in the underbody and are separated from one another in each case by a crossmember which extends in the vehicle transverse direction between the side sills. On account of the only limited available installation space, the battery modules can have only a relatively small vertical extent. The maximum available width of the installation space for accommodating the battery modules is also limited by the side sills. In return, a relatively large amount of installation space is available in the vehicle longitudinal direction approximately over the entire longitudinal extent of the passenger cell. This space can be effectively utilized if a plurality of battery modules each arranged next to one another are arranged behind one another, as viewed in the vehicle longitudinal direction.

The separation, by crossmembers, of the battery modules arranged behind one another in the vehicle longitudinal direction has a number of advantages. Thus, for example, the battery modules can at least also be fastened to the crossmembers. Moreover, the crossmembers increase the rigidity of the vehicle body particularly in the region of the underbody. Not all of the forces introduced during a side crash have to be dissipated via the side sills and the battery modules, but can thus also be channeled away, at least in part, via the crossmembers.

Advantageously, in each case a longitudinal member extends in the vehicle longitudinal direction between the crossmembers, which adjoin the battery modules, between two battery modules arranged next to one another in the vehicle longitudinal direction. In the event of a front crash, forces introduced in the vehicle longitudinal direction have to be dissipated. The side sills serve especially for this purpose. Between the side sills, the support between the crossmembers in the vehicle longitudinal direction is provided by the longitudinal members. In the event of a front crash, the longitudinal members can transfer and dissipate the introduced forces in the vehicle longitudinal direction, with the result that the battery modules are not stressed or at least only to a small degree.

Ideally, the longitudinal member is not connected to the crossmembers or only such that the connection is readily released upon forces acting on the longitudinal member in the vehicle transverse direction. This ensures that the longitudinal members do not adversely affect the desired displaceability of the battery modules in the vehicle transverse direction in the event of a side impact, or do so only to a minor extent.

The combination of crossmembers and longitudinal members ensures a high degree of rigidity of the underbody of the passenger cell of the passenger motor vehicle both in the event of a front crash and in the event of a side crash, with the result that the battery modules are effectively protected from damage. The front end section of the passenger motor vehicle as upstream deformation region additionally contributes to this protection in the event of a front crash. In the event of a side crash, the deformation elements between two battery modules arranged next to one another in the vehicle longitudinal direction additionally contribute to this protection and allow targeted yielding of the battery modules in the vehicle transverse direction. In the vehicle longitudinal direction, in return, the front end section of the motor vehicle already absorbs large fractions of the crash energy in the event of a front crash.

According to an advantageous embodiment, in each case two battery modules are arranged next to one another between the side sills, wherein the deformation element is arranged between the two battery modules in the vehicle transverse direction in the center. This is a simple symmetrical arrangement of battery modules, with the result that the weight of the battery modules is uniformly distributed in the vehicle transverse direction for battery modules of the same size. Nor is a central tunnel for a cardan shaft required in the case of purely electrically driven motor vehicles, since the electric drive motors are typically arranged locally at the drive axles. A continuous planar vehicle floor can be realized as a result. A central tunnel would also impede the desired displaceability of the battery modules. Instead, according to the invention, the deformation element is situated in the central region between the two battery modules.

In an advantageous manner, the battery modules are cuboid. This allows optimum utilization of the available installation space between the two side sills which extend parallel to one another in the vehicle longitudinal direction and laterally delimit the installation space.

In the event of a side crash with a narrow barrier, as viewed in the vehicle longitudinal direction, the barrier can impinge the side sill in a central region of a battery module or in a front or a rear region. In the event of an impact in a central region, the battery module can be displaced in the vehicle transverse direction toward the vehicle center and thereby compress the deformation element. By contrast, in the event of an impact in the front or rear region, the battery module is advantageously configured in such a way that it is at least also deformed in a twisting manner by the action of force. Thus, in the event of an impact of the barrier in the front region of the battery module, the front region is displaced more strongly toward the vehicle center than the rear region of the battery module. By contrast, in the event of an impact of the barrier in the rear region of the battery module, the rear region of the battery module is displaced further toward the vehicle center than the front region of the battery module. However, there occurs no rotation of the battery module in each case.

It is important here that, even under torsion of the battery module, the storage cells arranged therein are as far as possible not damaged. Ideally, the battery module therefore has arranged therein a plurality of cylindrical storage cells whose longitudinal axes are all parallel to one another. A particularly suitable arrangement of the storage cells is one in which all the longitudinal axes of the storage cells extend in the vehicle vertical direction. Under torsion of the battery modules, the storage cells roll and/or slide on one another, and can thus be displaced somewhat in the battery module without being damaged in the process. It is important here that the cabling of the storage cells with one another can accompany this displacement and the storage cells are not impeded in this movability by any fixings.

The deformation element between the battery modules should, on the one hand, be able to be compressed in a yielding manner but, on the other hand, should also be able to absorb as much energy as possible in the process. Suitable materials for this purpose are, for example, metal foams or polymer foams, since these materials are available in a cost-effective manner and have a low intrinsic weight. Equally suitable, however, are also numerous other embodiments. Thus, for example, the deformation element can also consist of an arrangement of numerous honeycombs which, for example, can be configured in one piece with one another in a component made of plastic.

The battery modules are arranged between the side sills, and, where appropriate, in the case of a plurality of battery modules arranged behind one another in the vehicle longitudinal direction, between the crossmembers. For fastening purposes, the battery modules can be correspondingly received on the side sills and/or on the crossmembers. However, a cover or floor respectively delimiting the battery modules to the top or to the bottom in the vehicle vertical direction can also serve for fastening. Both the side sills and the crossmembers and also a floor or cover here form part of the supporting structure of the motor vehicle. Here, each battery module is advantageously connected to the supporting structure of the motor vehicle via at least one holding device.

The holding devices fix the battery modules in their normal position. However, in the event of a side crash, the holding devices should not prevent the battery modules from being able to be correspondingly displaced in the vehicle transverse direction. Therefore, the holding devices are ideally designed in such a way that, under overload by a defined minimum force, they are released or break at a predetermined breaking point.

Consequently, the holding device does not impede the desired displaceability of the battery module during a side crash, since the defined minimum force is exceeded here. However, there is the possibility of the battery module jamming during displacement and thus of the deformation element not deforming as desired. To prevent this, after a release or breakage of the predetermined breaking point upon overload, the holding device advantageously still guides the battery module such that it can be displaced only in one spatial direction. This one spatial direction is preferably the vehicle transverse direction of the motor vehicle.

Here, the holding device can advantageously additionally be designed in such a way that, upon a displacement of the battery module along the spatial direction predetermined by the holding device, energy is absorbed in the holding device.

For this purpose, the guide in the holding device can have, for example, friction surfaces and/or a portion of the holding device can be deformed.

An exemplary embodiment of the invention, on the basis of which the invention will be described in more detail below, is illustrated in the drawings.

DETAILED DESCRIPTION OF THE DRAWINGS

Figure 1:
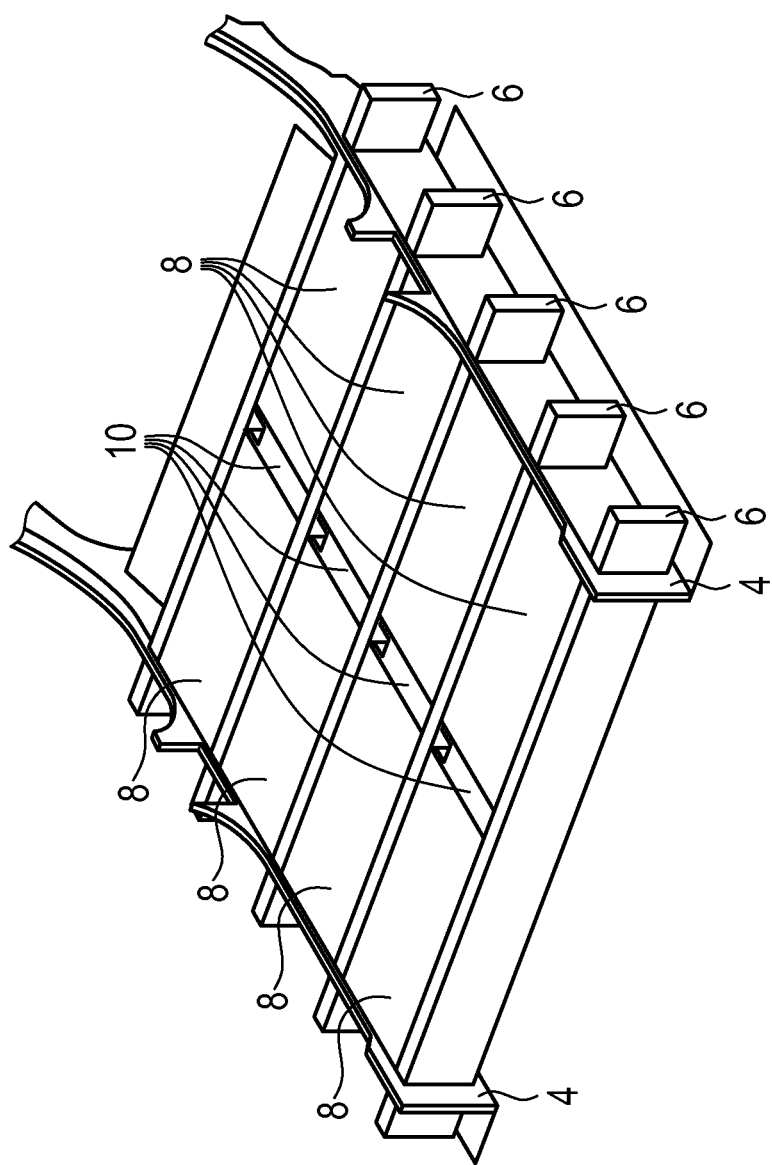
FIG. 1 is a schematic perspective view of an underbody of a passenger cell of a passenger motor vehicle having a plurality of battery modules.

FIG. 1 illustrates a perspective view of an underbody of a passenger cell of a passenger motor vehicle. The passenger cell of the passenger motor vehicle is situated between a front end section (not shown), which adjoins the passenger cell to the front in the vehicle longitudinal direction x, and a rear end section (likewise not shown), which adjoins the passenger cell to the rear in the vehicle longitudinal direction x. The passenger cell is delimited in the floor region on both sides by a respective side sill. The side sills, of sheet-metal shell construction, each consist of an inner panel and an outer panel which together in each case enclose a cavity in which further reinforcing elements can be incorporated. FIG. 1 illustrates only the inner panels 4 of the side sill, which extend as longitudinal members in the outer lateral region of the underbody in the vehicle longitudinal direction x. A plurality of crossmembers 6 extend in the vehicle transverse direction y between these two inner panels 4 of the side sill. The spacings between two adjacent crossmembers 6 in the vehicle longitudinal direction x are identical in each case.

As seen in the vehicle longitudinal direction x, in each case two cuboid battery modules 8 are situated next to one another between the two inner panels 4. Here, the battery modules 8 each directly adjoin the respective inner panel 4. As viewed in the vehicle transverse direction y, a deformation element 10 consisting of a polymer foam is situated in the central region between the two battery modules 8 arranged next to one another. As viewed in the vehicle longitudinal direction x, a plurality of rows of such battery modules 8 arranged next to one another are accommodated behind one another. Here, the battery modules 8 arranged behind one another are each separated from one another by a crossmember 6. The spacing of the crossmembers 6 from one another corresponds exactly to the dimensions of the battery modules 8, with the result that, as viewed in the vehicle longitudinal direction x, they each adjoin a crossmember 6 to the front and rear. The deformation element 10 can additionally accommodate a means for cooling the battery modules 8 and/or cables for contacting.

Figure 2A:
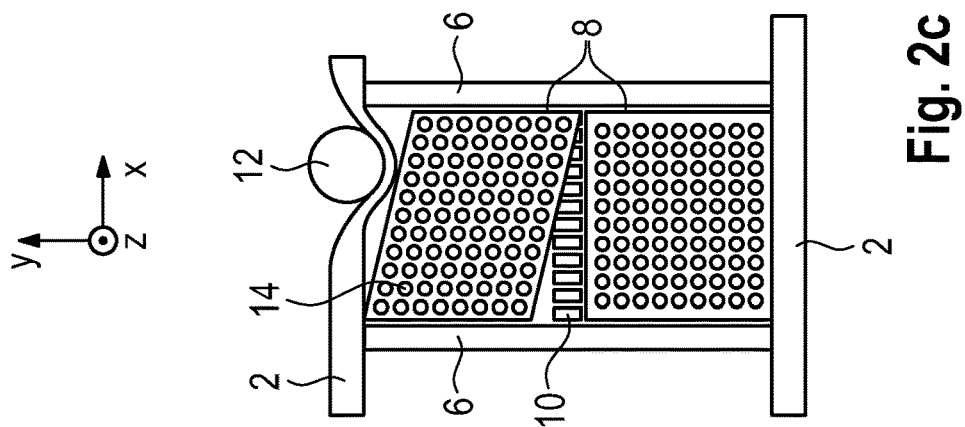
FIG. 2a is a schematic basic illustration of the arrangement of the battery modules shown in FIG. 1.
Figure 2B:
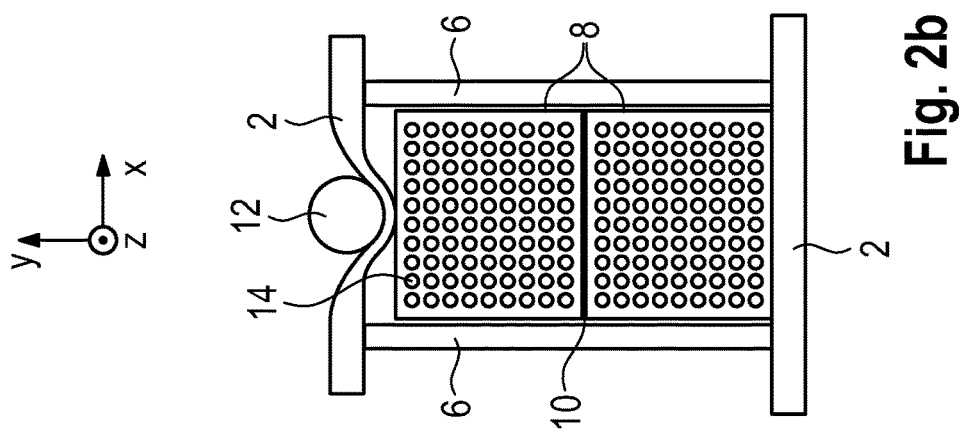
FIG. 2b shows the arrangement shown in FIG. 2a upon penetration of a barrier in the central region of a battery module.
Figure 2C:
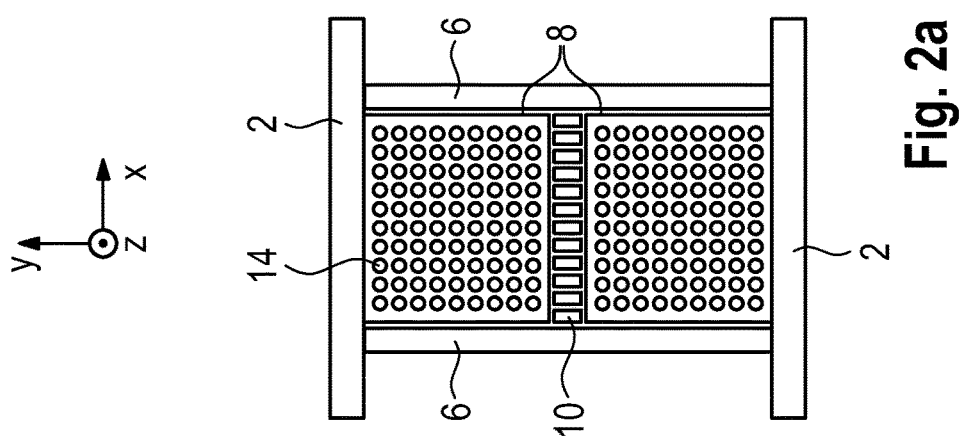
FIG. 2c shows the arrangement shown in FIG. 2a upon penetration of a barrier in the lateral region of a battery module.

FIGS. 2a to 2c will be used below to explain the basic mode of operation of this arrangement. Instead of the inner panels 4, FIGS. 2a to 2c each illustrate in very simplified form the entire side sills 2. Also shown is only one row with two battery modules 8 which, as viewed in the vehicle longitudinal direction x, are arranged next to one another and between which the deformation element 10 is arranged in the center.

FIG. 2a shows this arrangement when no mechanical loading acts on it. The two battery modules 8 each directly adjoin the side sills 2, and the deformation element 10 is not compressed or is compressed only slightly and holds the two battery modules 8 in their position.

FIG. 2b illustrates the same arrangement after a side crash in which a barrier 12 has struck the side sill 2 between the two crossmembers 6 in the vehicle transverse direction y. The impact of the barrier 12 has resulted in a deformation of the side sill 2. The latter has been pressed in locally in the vehicle transverse direction y by the barrier 12. This pressed-in region in turn presses onto the adjoining battery module 8 which is thus pressed against the deformation element 10. The deformation element 10 has been compressed as a result, because it has a lower rigidity than the battery module 8. The battery module 8 has thus been able to be displaced in the vehicle transverse direction y toward the vehicle center and move out of the way of the pressed-in side sill 2, with the result that it has not been damaged. It is important here that the rigidity of the battery module 8 is considerably higher than the rigidity of the deformation element 10. The energy introduced into the motor vehicle by the side crash is partially absorbed here by the deformation of the side sill 2, by the compression of the deformation element 10 and by the friction upon displacement of the battery module 8 on the adjoining components.

FIG. 2c shows the arrangement shown in FIG. 2a after a side crash in which a barrier 12 has struck the side sill 2 in the vehicle transverse direction y. Here, as viewed in the vehicle longitudinal direction x, the barrier 12 has struck the side sill 2 in the rear region of a battery module 8. Here, the impact of the barrier 12 also resulted locally in a deformation of the side sill 2. The latter has been pressed in locally in the vehicle transverse direction y by the barrier 12. This pressed-in region in turn presses onto the rear region of the adjoining battery module 8. This produces two effects: first, the entire battery module 8 is pressed against the deformation element 10 again. Second, the battery module 8 twists, thus distorting. Here, the rear, more highly loaded region of the battery module 8 is displaced further into the deformation element 10 than the front region. However, by virtue of the adjoining transverse webs, the battery module 8 cannot rotate here. Instead, torsion of the battery module 8 occurs. This deformation of the battery module 8 additionally contributes to the absorption of the crash energy introduced.

Many individual storage cells 14 which are electrically connected to one another are accommodated in the battery module 8. Here, the storage cells 14 are all cylindrical. They extend here with their longitudinal axis in the vehicle vertical direction z and are all parallel to one another. If then forces act on the storage cells 14, for example under a torsion of the battery module 8, said cells can roll and/or slide on one another without the possibility of them wedging. In this way, the storage cells 14 in the battery module 8 can be displaced somewhat without being damaged. For this purpose, however, the individual storage cells 14 must not be fixed rigidly in the battery module 8, since such a fixing would impede the desired displaceability. It is also necessary for the electrical contacting to be configured to be flexible such that the displaceability is not significantly adversely affected.

Overall, the arrangement according to the invention of the battery modules 8 arranged next to one another and the deformation element 10 arranged therebetween and also the crossmembers 6 between the individual rows with battery modules 8 offers such good protection that there is no longer any need for a battery housing which jointly surrounds all battery modules 8.

Figure 6:
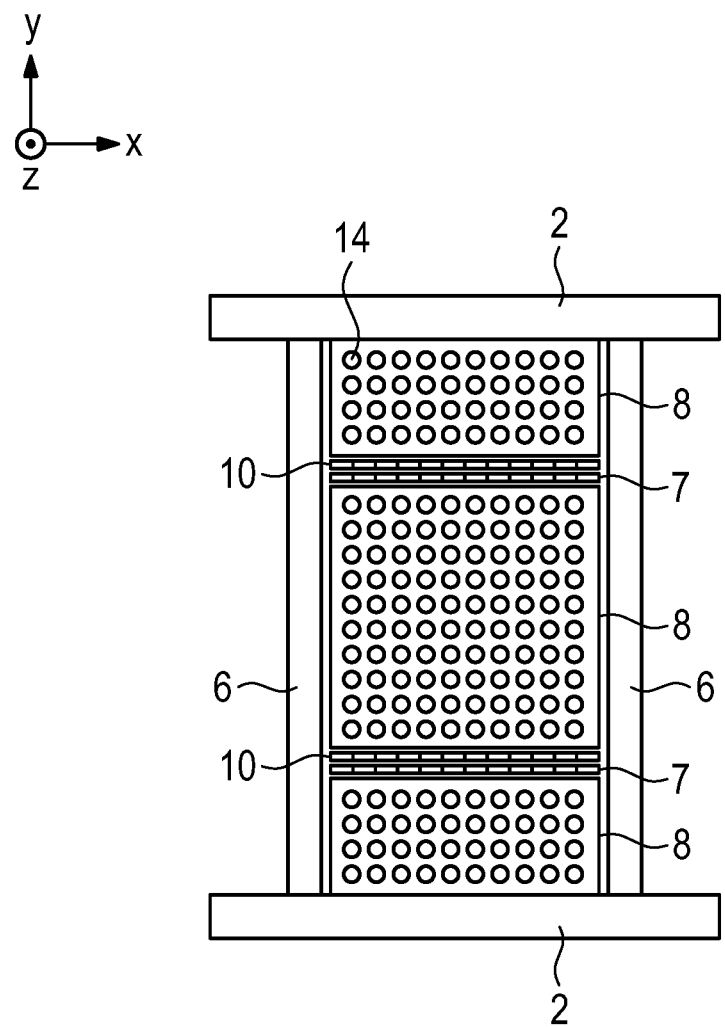
FIG. 6 shows an alternative arrangement of a plurality of battery modules in the underbody of a passenger cell of a passenger motor vehicle.

FIG. 6 shows an alternative arrangement to the arrangement disclosed in FIGS. 2a to 2c. A plurality of crossmembers 6 extend in the vehicle transverse direction y between the two side sills 2. As viewed in the vehicle transverse direction y, three battery modules 8 are accommodated between the two side sills 2 and between two crossmembers 6 and, as viewed in the vehicle longitudinal direction x, are arranged next to one another. Here, the two outer battery modules 8 are only half as wide as the central battery module 8. As viewed in the vehicle longitudinal direction x, all battery modules 8 each adjoin the crossmembers 6 to the front and rear. A deformation element 10 is in each case arranged between the battery modules 8. In this respect, the arrangement is very similar to the arrangement shown in FIGS. 2a to 2c and performs the same functions.

However, in the arrangement shown in FIG. 6, there is additionally situated, between each of the battery modules 8, next to the deformation element 10, a longitudinal member 7 as well. Each longitudinal member 7 extends in the vehicle longitudinal direction x and adjoins the crossmembers 6 on both sides. Here, the longitudinal members 7 are not attached to the crossmembers 6. Alternatively, the longitudinal members 7 can be connected to the crossmembers 6 such that the connections are released already at relatively low forces acting in the vehicle transverse direction y.

In the event of a side crash, exactly as in the arrangement shown in FIGS. 2a to 2c, the battery modules 8 can be displaced somewhat in the vehicle transverse direction y in that they deform the deformation elements 10. This desired displaceability is not impeded by the longitudinal members 7. Moreover, the crash forces introduced in the vehicle transverse direction y are dissipated via the crossmembers 6. As a result, the protection in the vehicle transverse direction y is so effective that the battery modules 8 do not have to be accommodated in an additional rigid battery housing in order to protect them from major damage.

In the event of a front crash, the front end section serves as a targeted deformation region which can take up large fractions of the introduced crash energy. The remaining introduced forces are dissipated by the side sills 2 in the vehicle longitudinal direction x. In addition, in this arrangement, the longitudinal members 7 between the crossmembers 6 can dissipate forces in the vehicle longitudinal direction x, with the result that these forces do not have to be taken up by the battery modules 8, or only to a significantly smaller extent. Consequently, the longitudinal members 7 optimize the dissipation of forces in the event of a crash, with the result that, even in the event of a front crash, the battery modules 8 no longer require an additional rigid battery housing but can be arranged directly in the vehicle underbody.

Figure 3:
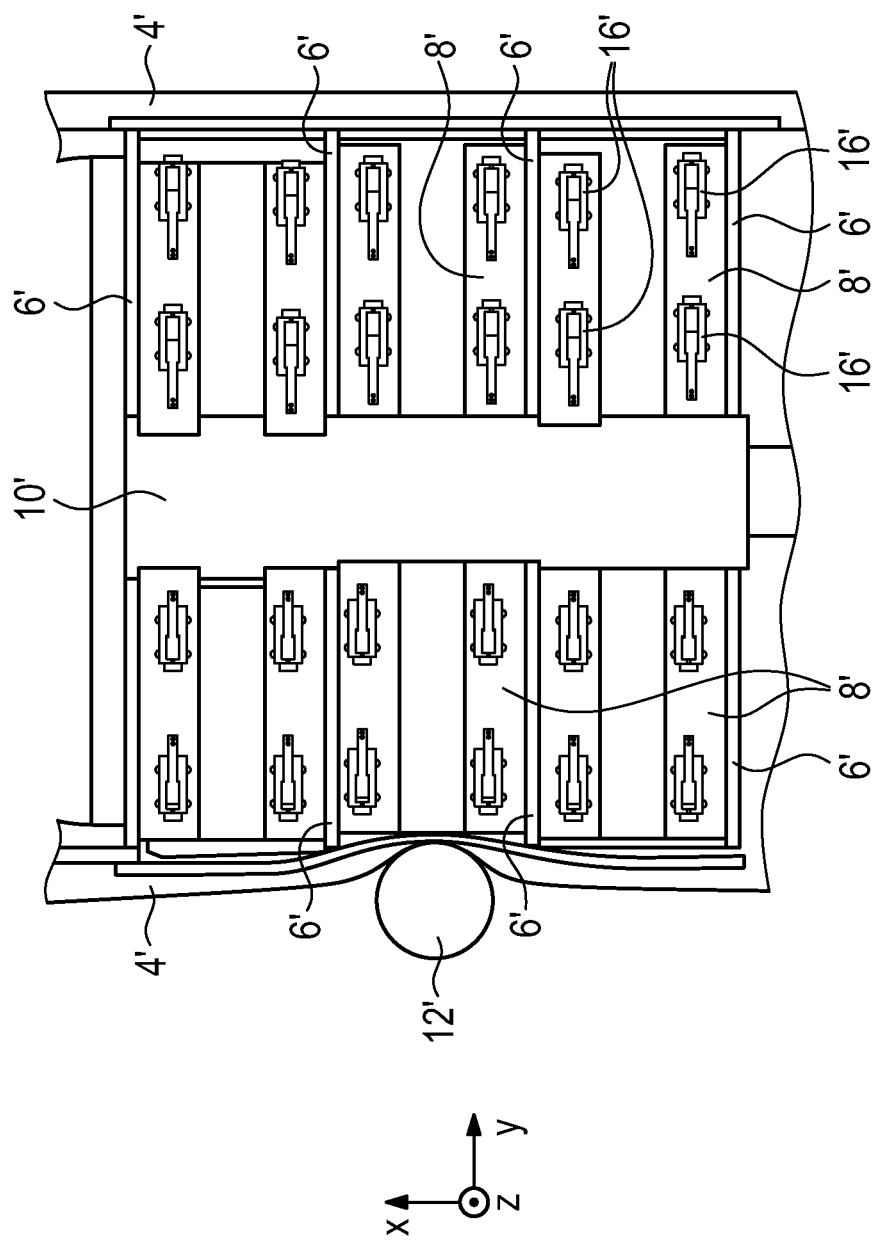
FIG. 3 is a schematic plan view of an arrangement similar to the arrangement shown in FIG. 1, with additional holding devices.

FIG. 3 shows a plan view of an arrangement which is very similar to the arrangement shown in FIG. 1. Therefore, the same reference signs, each supplemented by an apostrophe, are used in FIG. 3 for all components which correspond to a component already shown in FIG. 1.

Also in the exemplary embodiment shown in FIG. 3, as viewed in the vehicle longitudinal direction x, in each case two battery modules 8' are arranged next to one another and adjoin the inner panels 4' of the side sills. A deformation element 10' is arranged between the two battery modules 8'. The individual rows of the battery modules 8' arranged next to one another are separated from one another by crossmembers 6'.

Each battery module 8' is connected to the supporting structure of the motor vehicle via holding devices 16'. Forming part of the supporting structure here are the side sills with the inner panels 4', the crossmembers 6', but also a floor (not shown) or cover (not shown) of the underbody that respectively delimits the installation space of the battery modules 8' to the bottom or top. The holding devices 16' serve for fastening the battery modules 8' such that they are securely held in their desired position in normal operation. However, in the event of a side crash, the holding devices 16' must not impede the desired displacement of a battery module 8'. Therefore, the holding devices 16' are designed in such a way that, upon an overload, that is to say when the force acting on the holding device 16' exceeds a defined limit value, the fixing of the battery module 8' by the holding device 16' is either released or the fixing breaks, with the result that the battery module 8' can be displaced.

In addition, the holding devices 16' perform the function of a longitudinal guide: after release or breakage of the fixing, the holding devices 16' serve as a guide such that the battery module 8' can be displaced only along the longitudinal guide. A situation is thereby prevented in which the battery module 8' can be jammed upon displacement, with the result that it is not displaced as desired. There are a number of technical solutions for such holding devices 16'. A first embodiment of such a holding device 16' is shown in FIGS. 4a and 4b, and a further embodiment is illustrated in FIGS. 5a and 5b.

Figure 4A:
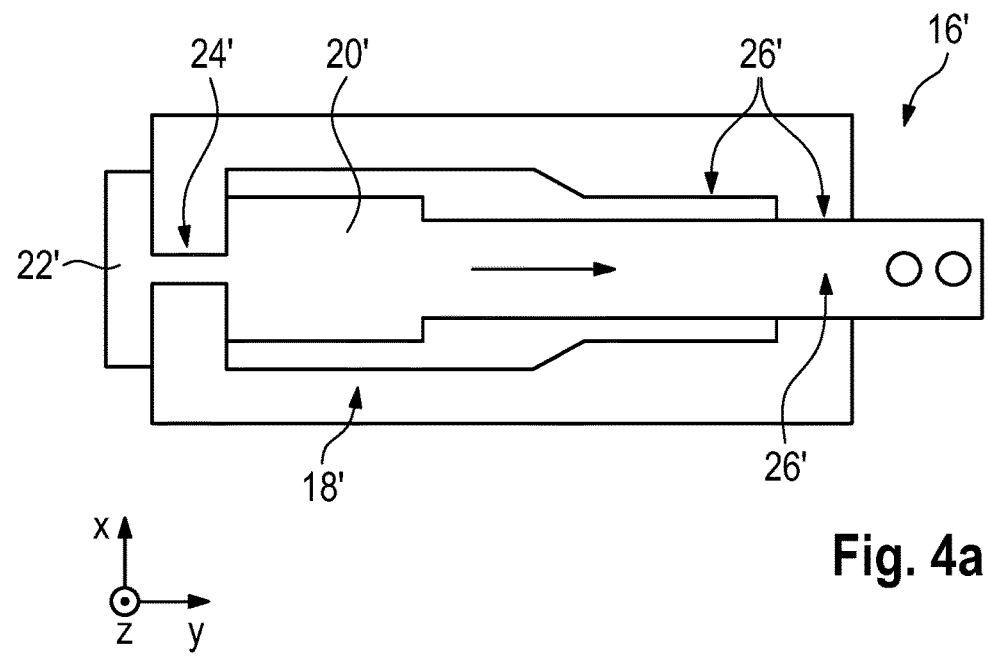
FIG. 4a shows a first embodiment of a holding device in a normal position.
Figure 4B:
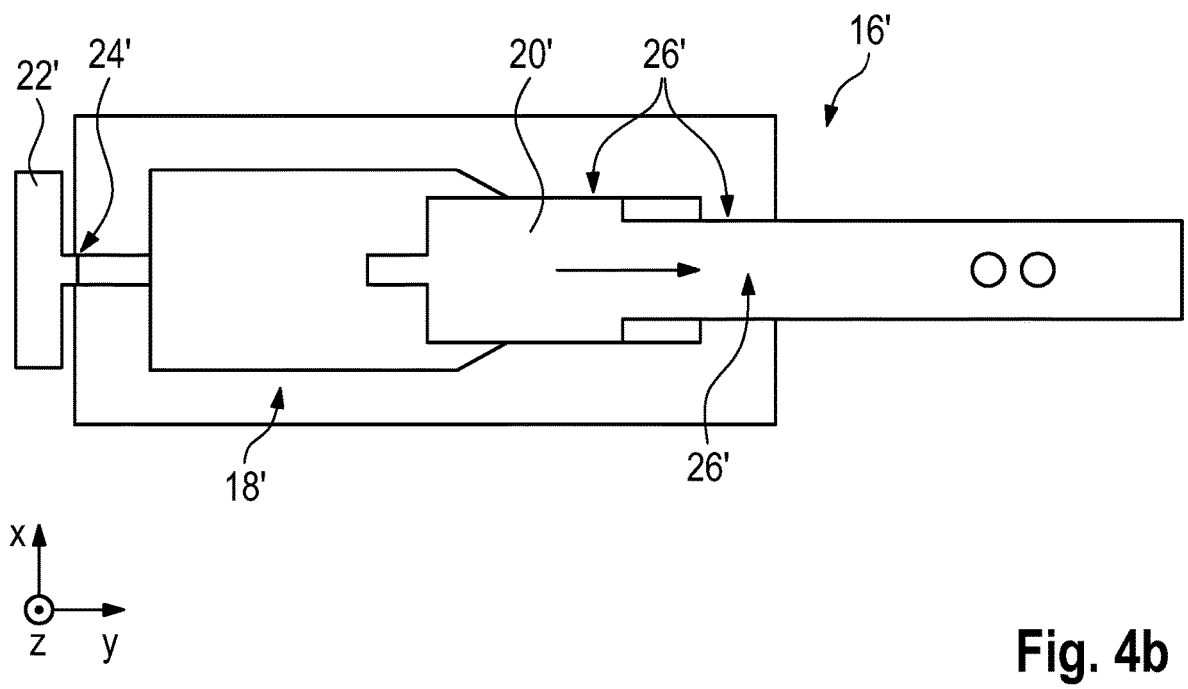
FIG. 4b shows the holding device shown in FIG. 4a after a displacement.
Figure 5A:
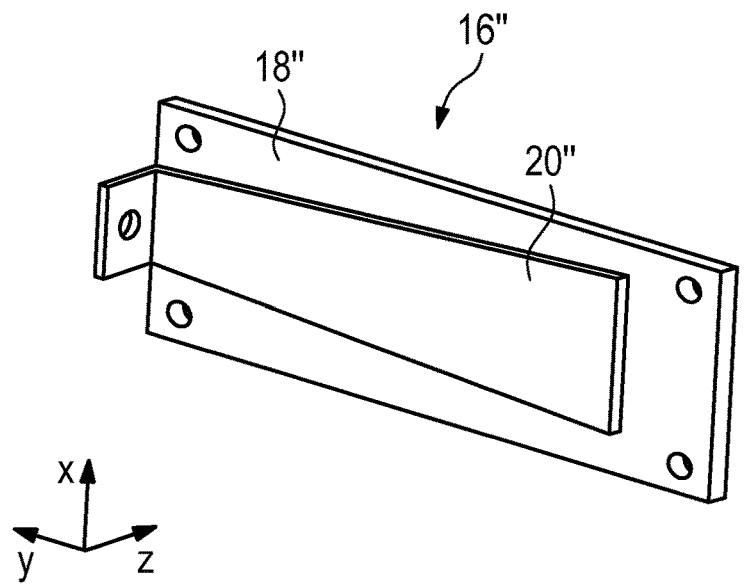
FIG. 5a shows a second embodiment of a holding device in a normal position.
Figure 5B:
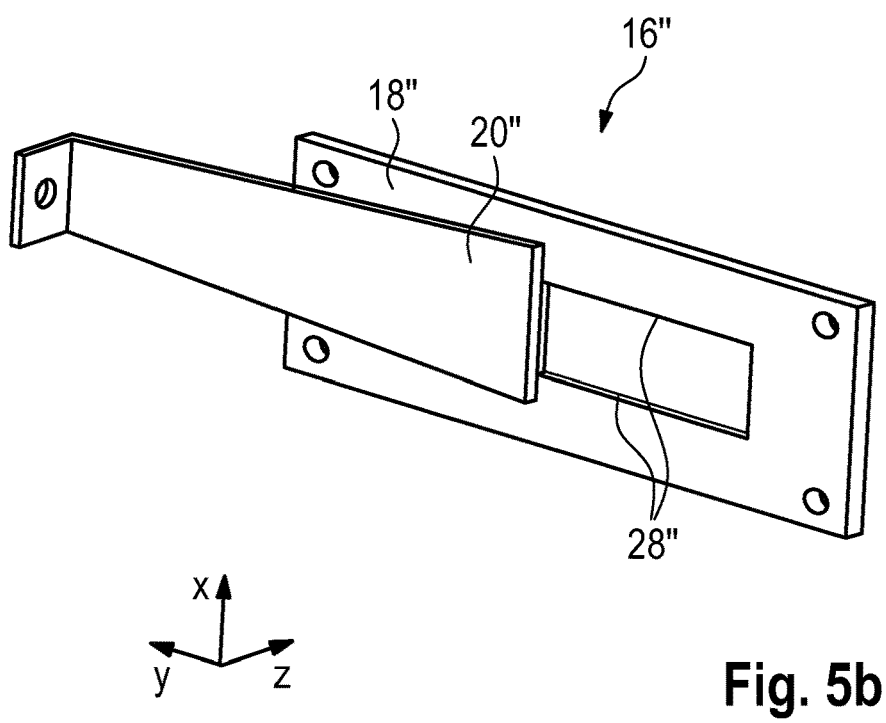
FIG. 5b shows the holding device shown in FIG. 5a after a displacement.

The holding device 16' shown in FIGS. 4a and 4b comprises a movable, piston-like portion 20' which is guided in a hollow cylindrical guide in a fixed receptacle 18'. Here, the holding device 16' is fastened to a crossmember, for example, by way of the fixed receptacle 18', whereas the movable portion 20' is connected to the battery module 8'.

The movable, piston-like portion 20' is connected via a thin connection to a mushroom-shaped end portion 22' which projects out of the fixed receptacle 18' at the rear. The mushroom-shaped end portion 22' forms a form-fit together with the piston-like portion 20' and the thin connection, with the result that, in the basic position shown in FIG. 4a, no displacement of the movable, piston-like portion 20' in the fixed receptacle 18' is possible.

The thin connection between the mushroom-shaped end portion 22' and the movable, piston-like portion 20' forms a predetermined breaking point 24' which—as shown in FIG. 4b—breaks under overload. The movable, piston-like portion 20' can then be displaced in the fixed receptacle 18' in the transverse direction y, with the result that the battery module 8' can be displaced in a guided manner in one direction. Here, the sliding surfaces between the movable, piston-like portion 20' and the fixed receptacle 18' can be configured as friction surfaces 26' such that a displacement occurs only when a corresponding force acts on the movable, piston-like portion 20'. Here, the friction surfaces 26' additionally serve for energy absorption.

FIGS. 5*a* and 5*b* show an alternative embodiment of a holding device 16". This holding device 16" also comprises a movable part 20" which is guided on a fixed receptable 18". Here, the guide is formed by two oblique guide surfaces 28" on the fixed receptacle which run toward one another at a very flat angle and between which the movable part 20" is held in a form-fitting manner. A guided displacement in the transverse direction y is possible here only when the movable part 20" is plastically deformed and is compressed between the oblique guide surfaces 28". The plastic deformation of the movable part 20" allows energy to be absorbed here.

LIST OF REFERENCE SIGNS

2 side sill
4, 4' inner panel (of the side sill)
6, 6' crossmember
7 longitudinal member
8, 8' battery module
10, 10' deformation element
12, 12' barrier
14 storage cell
16', 16" holding device
18', 18" fixed receptacle (of the holding device)
20', 20" movable portion (of the holding device)
22' fixing portion
24' predetermined breaking point
26' friction surface
28" oblique guide surface

What is claimed is:

1. A motor vehicle having a plurality of battery modules for storing electrical energy in a region of an underbody of a passenger cell of the motor vehicle, wherein the underbody is delimited on both sides by a respective side sill, comprising:
at least two battery modules arranged next to one another between the side sills as viewed in a vehicle longitudinal direction, wherein
in each case a battery module adjoins a respective side sill, and
at least one deformation element in each case is arranged between the battery modules, the deformation element having a lower rigidity than the battery modules and being configured so as to be compressed via a respective battery module that is displaced transversely toward a vehicle center.

2. The motor vehicle according to claim 1, wherein
as viewed in the vehicle longitudinal direction, multiple battery modules arranged next to one another are accommodated behind one another in the underbody and are separated from one another in each case by a crossmember which extends in the vehicle transverse direction between the side sills.

3. The motor vehicle according to claim 2, wherein
in each case a longitudinal member extends between the crossmembers, which adjoin the battery modules, in the vehicle longitudinal direction between two battery modules arranged next to one another in the vehicle longitudinal direction.

4. The motor vehicle according to claim 3, wherein
the longitudinal member is not connected to the crossmembers or only connected such that the connection is readily released under forces acting on the longitudinal member in the vehicle transverse direction.

5. The motor vehicle according to claim 1, wherein
in each case two battery modules are arranged between the side sills, and
the deformation element is arranged in the center between the two battery modules in the vehicle transverse direction.

6. The motor vehicle according to claim 1, wherein
the battery modules are cuboid.

7. The motor vehicle according to claim 6, wherein
at least one battery module is designed to be able to deform under action of force.

8. The motor vehicle according to claim 7, wherein
a plurality of cylindrical storage cells are arranged in the battery module and are displaceable under torsion in the battery module.

9. The motor vehicle according to claim 1, wherein
the at least one deformation element is made of a metal foam or polymer foam.

10. The motor vehicle according to claim 1, wherein
the battery modules are each connected to a supporting structure of the motor vehicle via at least one holding device.

11. The motor vehicle according to claim 10, wherein
the at least one holding device is designed so as to be released under overload by a defined minimum force or so as to break at a predetermined breaking point.

12. The motor vehicle according to claim 11, wherein
after release under overload or breakage of the predetermined breaking point, the holding device still guides the battery module such that the battery module is displaced in a guided manner only in one spatial direction.

13. The motor vehicle according to claim 12, wherein
the holding device is designed such that, during a displacement of the battery module along the one spatial direction predetermined by the holding device, energy in the holding device is absorbed.

14. The motor vehicle according to claim 13, wherein
for energy absorption, the guide in the holding device has friction surfaces and/or a portion of the holding device is deformed.

\* \* \* \* \*